Dec. 5, 1961 H. TAUDT 3,012,093
METHOD OF SUCCESSIVELY PRODUCING THE SINGLE RECORDS OF
A SET OF CORRECTED PHOTOGRAPHIC
COLOR SEPARATION RECORDS
Filed Dec. 17, 1959
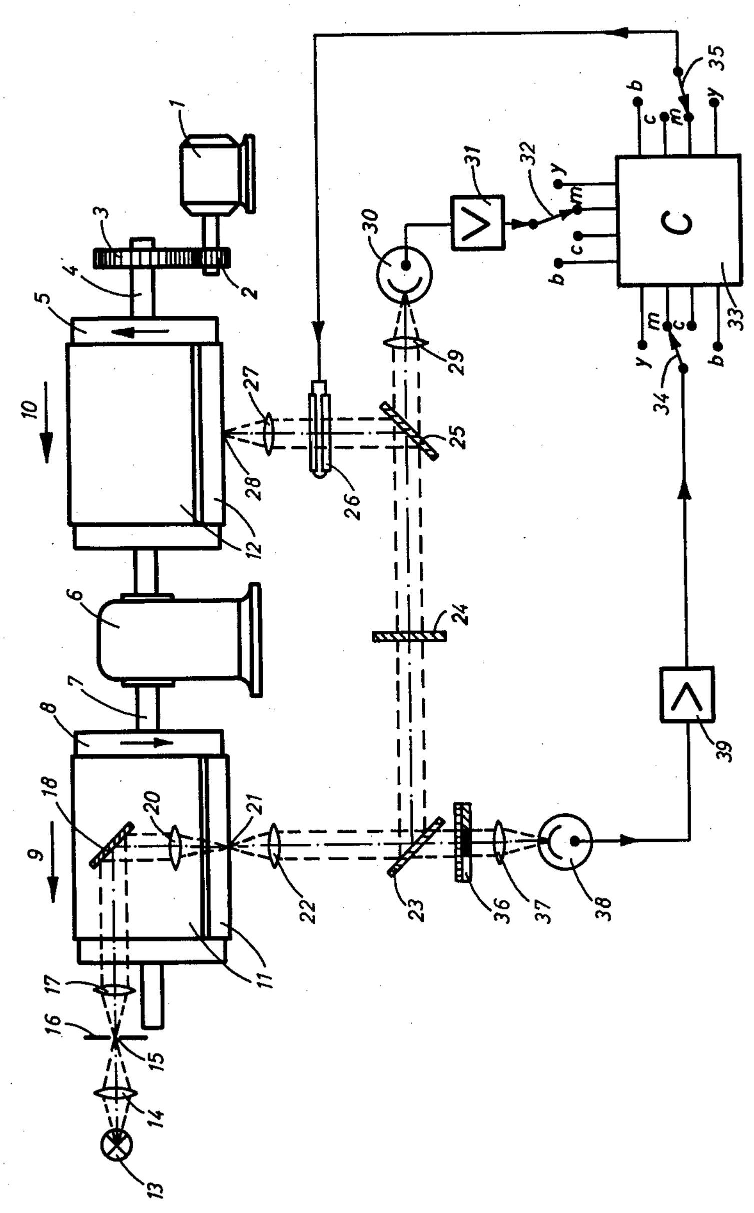
Heinz Taudt
INVENTOR United States Patent Office 3,012,093

Patented Dec. 5, 1961

3,012,093

METHOD OF SUCCESSIVELY PRODUCING THE SINGLE RECORDS OF A SET OF CORRECTED PHOTOGRAPHIC COLOR SEPARATION RECORDS

Heinz Taudt, Kiel, Germany, assignor to Dr.-Ing. Rudolf Hell Kommanditgesellschaft, Kiel-Dietrichsdorf, Germany, a German company Filed Dec. 17, 1959, Ser. No. 861,734

Claims priority, application Germany Dec. 18, 1958

1 Claim. (Cl. 178—5.2)

This invention relates to a method of successively producing the single records of a set of corrected photographic color separation records from a colored original to be reproduced by synchronously scanning the original and recording one record each of said set by means of a single light source serving simultaneously to scan the original and to record the color separation record, a main light beam and an auxiliary light beam being provided between the original and the record, the auxiliary beam being split from said main beam.

In the reproduction art color correction methods are known wherein a single light source is used to scan or illuminate the colored original to be reproduced and also to record or expose the corrected records—i.e., the original and the record are placed in the same beam.

In one of these methods (Hunter-Penrose's "Autoscan") of use for reflecting originals and transparent originals, a stationary colored original is scanned dotwise along consecutive lines by a movably disposed constant point light source. By means of a stationary optical system an identical or enlarged or reduced image of the scanned dots is formed seriatim on a stationary unexposed photographic plate or film, a color filter being disposed in the path of the beam. Disposed in the path of the beam reflected by or passing through the original is a semipermeable mirror by which some of the beam is deflected and split up into three beams by other appropriately placed semipermeable mirrors to pass through three color filters to three photocells. The basic color signals produced in accordance with the basic color components of the light reflected by or passing through the original are supplied to an electronic computer, the outputs of which provide modulation signals for controlling the scanning and recording light. Light intensity is controlled by means of a galvanometer mirror, rather as in a loop oscillograph.

In this method the corrected color separation records are recorded seriatim, a different color filter being placed in the path of the main beam for each such record.

In a variant of the method described, the transparency originals are scanned by a cathode ray tube instead of by a mechanically moved point light source. In this case either contact methods are used—i.e., the transparency original is placed directly on the tube screen—or an image of the electronic spot on the screen is formed on the original by an optical system, with the result that originals larger than the screen can be scanned. The three photocells supplying the inputs of the electronic computer are illuminated through three color filters by three beams derived from the main beam between the original and the recording support, and electron beam brightness is controlled by the computer outputs in accordance with the changing coloring of the scanned dots of the original.

In another color correction method (Crosfield's "Scanatron") the scanning and recording light beam impinges directly upon that layer of the subsequent corrected color separation record which it is required to expose; the intensity of the light source (cathode ray tube) is controlled by an electronic computer, the inputs of which are supplied with electric signals corresponding to the basic colors by means of three photocells, each such photocell receiving the filtered light which passes through the transparency original disposed in the main beam. The variations in light source intensity must therefore correspond to the complete range of densities of the corrected color separation record to be recorded. The provision of an additional monitor photocell illuminated directly by the varying-brightness light source renders the electronic computer independent of the brightness variations required to record the corrected color separation records—i.e., the monitor photocell ensures that computing is controlled solely by the varying densities of the original.

In this method the starting material, instead of being transparent originals, can be uncorrected photographic color separation records, in which case color filters are, of course, not used.

In another color correction method (Crosfield) the scanning and recording light beam does not pass directly to that layer of the subsequent corrected record which it is required to expose but reaches said layer only after passing through an uncorrected photographic record negative or through the transparent original and a filter. The advantage of this process over the process just described is that much less variation in the intensity of the light source—i.e., in the maximum "swing" of the light modulation—is needed, for instead of signals being produced for the whole range of density only the correction signals for variations in density values need to be produced, the recording light already having been premodulated by the separation record negative or transparency original in association with the filter. This method also requires an additional monitor photocell which is acted on directly by the brightness variations of the light source and which controls the electronic computer in such a way that the same is not affected by said brightness variations; hence only the basic color signals produced by the varying densities of the original or of the separation records thereof are used for computation.

A common feature of all the color correction methods hereinbefore described is that the corrected color separation records are recorded consecutively in time and that the light used for the recording is always modulated to some extent by variations in the brightness of the scanning light.

The method according to the invention comprises the following steps: Scanning the original with constant light, the light passed through the original being premodulated by the varying densities of the original, filtering said main beam according to the color of the record in question, deriving an electrical main signal from said filtered main beam, said main signal being proportional to the intensity of said filtered main beam, filtering said auxiliary beam according to the color residual of the record in question, deriving an electrical auxiliary signal from said filtered auxiliary beam, the auxiliary signal being proportional to the intensity of said filtered auxiliary beam, computing an electrical correction signal from said main signal and said auxiliary signal according to any suitable color correction function, and postmodulating said premodulated and filtered main beam by said correction signal.

The advantages of the invention over the known color record processes are that, due to the scanning light being at a constant intensity, the photocells are in an uncontrolled light flux, that feedback (Hunter-Penrose) of the light source to itself, possibly causing hunting and time delays, is obviated, and that the recording light, which is derived from the same light source, is premodulated only by the varying densities of the original or of the separation records thereof. Incorrect recordings of the corrected color separation records due to random unwanted variations of the scanning light and to feedback are therefore precluded.

It is of no importance to the invention which of the many known color conversion processes (choice of the color correction functions) is used.

An embodiment of the invention is diagrammatically illustrated in the drawing as used in association with a known simplified color conversion process. The same differs from other and much more expensive processes in that only the basic color of the required color separation record, and a correction color mixture, are derived from the scanned colored picture dot, and in that the color separation record channel is so controlled by the correction color channel that the shades and hues of the separation record are corrected, and that the color separation record channel controls exposure means.

A constant-speed motor 1 drives through a pair of gears 2, 3 a shaft 4 bearing a recording cylinder 5. Through the agency of gearing 6 a shaft 7 is rotated in the opposite direction. Secured to the shaft 7 is a transparent scanning cylinder 8 which rotates in the opposite direction to the cylinder 5. Further consideration of the apparatus will be based on the assumption that the speeds and diameters of the two cylinders 5, 8 are equal, in the manner required for recording the color separation record in its original size.

As they rotate, the two cylinders 5, 8 are simultaneously and at the same speed moved, as indicated by arrows 9, 10, slowly past a scanning and recording device to be described hereinafter, with the result that the two cylinders 5, 8 are scanned and recorded helically. Alternatively, since the movement required is a relative one, the scanning and recording systems can be moved axially instead of the cylinders 5, 8.

Color separation records larger or smaller than the original can be prepared by varying the cylinder speed ratio by means of the gearing 6 and appropriately varying the rate at which one of the two cylinders moves past the scanning and recording device.

Instead of two drums, two plane carriages can be used which perform periodic line spacing and advancing motions in two directions perpendicular to one another and which can, if required, comprise means for varying image size and to which the original and an unexposed photographic plate are secured.

Finally, a single carriage can be used which can be moved in two directions perpendicular to one another, the original being clamped on one side thereof, and the unexposed photographic film being clamped on the opposite side of the carriage. In such a case the scanning and recording systems are disposed exactly opposite one another.

Cylinder apparatus will be preferred for flexible originals and recording film, and table apparatus will be preferred for rigid originals and photographic plates.

The numerous possible mechanical constructions, some of which have been referred to, are, however, of no importance for the subject matter of the invention, for which reason only one construction, with the advantage of reduced mechanical outlay, is illustrated in the drawing.

An original 11, assumed to be in the form of a colored film diapositive, is clamped to the scanning cylinder 8, while an unexposed photographic film 12 on which the corrected separation record is being recorded is clamped to the recording cylinder 5.

By means of a lens 14, the light point of a stationary point-shaped constant light source 13 is focused upon an aperture 15 in a diaphragm 16.

By means of a lens 17 an image of the illuminated aperture 15 is imaged to infinity. A stationary mirror 18 disposed in the cylinder 8 at an angle of 45° to the axis thereof deflects the beam through 90°, while by means of a stationary focusing system 20 in the cylinder 8 an image, in the form of a light spot 21, of the illuminated aperture 15 is formed on the original 11 secured to the transparent scanning cylinder 8. The light spot 21 is much greater, for instance, five times greater, than is necessary for forming an adequately sharp image of the contours and is, for instance, 0.5 mm. in diameter for a color separation record not given subsequent enlargement. The unit rate of advance of the cylinder 8 is so small—i.e., the scanning line density is so great—that the diameter of the spot 21 is greater than the distance between two lines so that the scanning spots in two adjacent lines overlap and the line structure disappears. The original can be reproduced in laterally correct or mirror inverted form, depending upon the printing process used. However, care is required to ensure that the various image elements are reproduced correctly, in such manner that the contours of adjacent image elements of the formed image are contiguous with one another in exactly the same way (possibly with lateral inversion) as the corresponding contours of the image elements of the original. To this end, reversing systems or prisms can, if required, be placed in the path of the beam. Disposed on the opposite side of the original 11 in the path of the beam is an optical system 22 which makes the bunch of rays parallel—i.e., forms an image of the spot 21 to infinity. Following the system 22 is a semipermeable mirror 23 which reflects some of the scanning light and passes some of it and which serves to supply a color correction channel to be described hereinafter. Following the mirror 23 in the path taken by the reflected part of the beam is an interchangeable color separation filter 24 determining the kind of color separation record to be produced, for instance, a cyan-violet filter for the yellow color separation record, a cyan-green filter for the magenta color separation record and an orange filter for the cyan color separation record. The three color separation records and possibly a fourth black record are prepared one after another, the filter 24 being changed for each record. Following the filter 24 a semi-permeable mirror 25 is disposed which is at an angle of 45° to the incident beam; some of the beam passes through the mirror 25 to the color separation channel and some is reflected on to the recording cylinder 5. Disposed in the path of the beam between the mirror 25 and the cylinder 5 is a light modulator 26 providing a controllable modulation of the passing light flux. The light modulator 26 can take the form, for instance, of a Kerr cell, a crystal cell, a galvanometer mirror or a diaphragm with controllably variable aperture. The light modulator 26 is in all cases electrically controlled by the color separation channel to be described hereinafter and by the color correction channel. Following the light modulator 26 is a focusing system 27 which makes the parallel beam convergent and focuses the spot 21, as a light spot 28, on to the photo sensitive layer of the film 12. Provided that the light modulator 26 is appropriately controlled by the color separation channel and by the correction channel, a corrected color separation record is produced on said photo-sensitive layer.

The light passing through the interchangeable color filter 24, which passes only the particular color required for the preparation of the color separation record, is made convergent by a focusing system 29 after passing through the semi-permeable mirror 25 and is concentrated on the cathode of a photocell 30. The photocurrents delivered by the photocell 30 are amplified in a photocell amplifier 31 and supplied through a switch 32 to an electronic computer 33. The same comprises: four inputs *y, m, c, b* which are connected seriatim, depending upon the sequence in which the color separation records are produced, to the color separation channel; four other inputs *y, m, c, b* which are connected in the same sequence through a switch 34 to the correction channel; and four outputs *y, m, c, b* which are correspondingly connected seriatim through the switch 35 to the control input of the light modulator 26.

The correction channel comprises an interchangeable filter combination 36, a focusing system 37, a photocell 38 and a photocell amplifier 39. The interchangeable filter combination 36 is selected to pass only the required mixed or residual color needed for correction. The light passing through the correction color filter 36 is made convergent by the focusing system 37 and the scanning spot 21 is focused upon the cathode of the photocell 38. The voltage delivered thereby is amplified in the amplifier 39 and passes through the switch 34 to one of the inputs of the electronic computer 33.

The process described can also be used to prepare copies of a (photographic) original in which the contrast differs considerably from the original and to an extent far greater than can be achieved by using copying paper of various degrees of hardness or softness. The optical arrangement can then be simplified only one photoelectric correction channel being branched off from the main beam and no color filters being used. Correspondingly the computer then comprises only one input and one output, and in it the densities to be recorded are computed according to a prescribed function of the scanned densities.

Changes and modifications may be made within the scope and spirit of the appended claim.

What I claim is:

The method of successively producing the single records of a set of corrected photographic color separation records from a colored original to be reproduced by synchronously scanning the original and recording one record each of said set by means of a single light source serving simultaneously to scan the original and to record the color separation record, a main light beam and an auxiliary light beam being provided between the original and the record, the auxiliary beam being split from said main beam, comprising scanning the original with constant light, the light passed through the original being premodulated by the varying densities of the original, filtering said main beam according to the color of the record in question, deriving an electrical main signal from said filtered main beam, said main signal being proportional to the intensity of said filtered main beam, filtering said auxiliary beam according to the color residual of the record in question, deriving an electrical auxiliary signal from said filtered auxiliary beam, the auxiliary signal being proportional to the intensity of said filtered auxiliary beam, computing an electrical correction signal from said main signal and said auxiliary signal according to any suitable color correction function, and postmodulating said premodulated and filtered main beam by said correction signal.

References Cited in the file of this patent

UNITED STATES PATENTS 2,670,665 Caldwell ---------------- Mar. 2, 1954